United States Patent
Zhan et al.

(10) Patent No.: US 12,504,556 B2
(45) Date of Patent: Dec. 23, 2025

(54) METHOD AND APPARATUS FOR OBTAINING FORMATION DENSITY

(71) Applicant: CHINA PETROLEUM & CHEMICAL CORPORATION, Beijing (CN)

(72) Inventors: Sheng Zhan, Houston, TX (US); Jeremy Zhang, Houston, TX (US)

(73) Assignee: CHINA PETROLEUM & CHEMICAL CORPORATION, Beijing (CN)

(*) Notice: Subject to any disclaimer, the term of this patent is extended or adjusted under 35 U.S.C. 154(b) by 209 days.

(21) Appl. No.: 18/409,275

(22) Filed: Jan. 10, 2024

(65) Prior Publication Data
US 2024/0184011 A1   Jun. 6, 2024

Related U.S. Application Data

(63) Continuation-in-part of application No. 17/653,561, filed on Mar. 4, 2022, now Pat. No. 12,092,787, (Continued)

(51) Int. Cl.
*G01V 5/10* (2006.01)
*E21B 49/00* (2006.01)

(52) U.S. Cl.
CPC .............. *G01V 5/104* (2013.01); *E21B 49/00* (2013.01)

(58) Field of Classification Search
CPC ...... G01V 5/104; E21B 49/00; E21B 2200/20
See application file for complete search history.

(56) References Cited

U.S. PATENT DOCUMENTS 2,475,137 A * 7/1949 Herzog ............... G01V 5/145
376/160
3,582,655 A 6/1971 Hoyer et al.
(Continued)

FOREIGN PATENT DOCUMENTS

CN   1595202 A   3/2005
CN   101501531 A   8/2009
(Continued)

OTHER PUBLICATIONS

Chu, Qingjun; "Development of Array Neutron Porosity Logging Tool"; Well Logging Technology; vol. 43, No. 1; Feb. 28, 2019; pp. 87-91.
(Continued)

*Primary Examiner* — David J Makiya
*Assistant Examiner* — Gisselle M Gutierrez
(74) *Attorney, Agent, or Firm* — NKL Law; Allen Xue

(57) ABSTRACT

A method for obtaining elemental concentration and determining the formation density uses a tool having multiple dual-function detectors that can detect both neutrons and gamma rays simultaneously. The method includes emitting neutrons into the formation, detecting neutron and gamma ray signals from the formation and discriminating the neutron signal and the gamma ray signal, obtaining the space, time and energy dependent fluence rates for fast neutrons and thermal neutrons, obtaining gamma ray energy spectra from initial inelastic gamma rays and backscattered inelastic gamma rays from one or more detectors. The formation density can be calculated based on one or more ratios between the gamma ray count rates at the one or more detectors to the gamma ray count rate at the near detector.

11 Claims, 11 Drawing Sheets

Related U.S. Application Data which is a continuation-in-part of application No. 17/333,834, filed on May 28, 2021, now Pat. No. 11,906,692.

(60) Provisional application No. 63/148,571, filed on Feb. 11, 2021, provisional application No. 63/148,573, filed on Feb. 11, 2021.

(56) References Cited

U.S. PATENT DOCUMENTS

| | | | |
|---|---|---|---|
| 3,777,147 | A | 12/1973 | Hoyer et al. |
| 4,122,339 | A | 10/1978 | Smith, Jr. et al. |
| 4,286,150 | A | 8/1981 | Allen |
| 4,379,228 | A | 4/1983 | Allen |
| 4,937,446 | A * | 6/1990 | Mckeon .............. G01V 5/102 250/266 |
| 5,327,773 | A | 7/1994 | Nishimura |
| 5,349,184 | A | 9/1994 | Wraight |
| 5,521,378 | A | 5/1996 | Roscoe et al. |
| 5,767,510 | A * | 6/1998 | Evans .............. G01V 5/08 250/269.1 |
| 5,789,752 | A * | 8/1998 | Mickael .............. G01N 23/222 250/269.4 |
| 6,044,326 | A * | 3/2000 | Huiszoon .............. E21B 47/085 702/6 |
| 6,207,953 | B1 | 3/2001 | Wilson |
| 6,997,257 | B2 * | 2/2006 | Snoga .............. E21B 47/026 166/254.2 |
| 7,365,307 | B2 | 4/2008 | Stoller et al. |
| 7,525,100 | B2 | 4/2009 | Kraemer et al. |
| 7,633,058 | B2 | 12/2009 | Stoller et al. |
| 7,791,017 | B2 | 9/2010 | Stephenson et al. |
| 7,910,894 | B2 | 3/2011 | Kraemer et al. |
| 8,598,510 | B2 | 12/2013 | Zhang et al. |
| 8,637,807 | B2 | 1/2014 | Evans |
| 8,849,573 | B2 | 9/2014 | Zhang et al. |
| 8,853,618 | B2 * | 10/2014 | Inanc .............. G01V 5/104 250/265 |
| 9,012,836 | B2 | 4/2015 | Wilson et al. |
| 9,304,214 | B2 * | 4/2016 | Zhou .............. G01T 3/06 |
| 9,477,006 | B2 | 10/2016 | Zhou et al. |
| 9,835,759 | B2 | 12/2017 | Grau |
| 9,885,802 | B2 * | 2/2018 | Chace .............. E21B 47/005 |
| 9,897,718 | B2 * | 2/2018 | Mauborgne .............. G01V 5/101 |
| 10,061,056 | B2 | 8/2018 | Moake |
| 10,208,582 | B2 * | 2/2019 | Ma .............. E21B 49/00 |
| 10,379,253 | B2 | 8/2019 | Zhou et al. |
| 11,774,630 | B2 | 10/2023 | Inanc et al. |
| 2003/0068001 | A1 | 4/2003 | Pearcy et al. |
| 2003/0178560 | A1 | 9/2003 | Odom et al. |
| 2005/0028586 | A1 * | 2/2005 | Smits .............. G01V 5/12 250/269.4 |
| 2005/0067160 | A1 * | 3/2005 | Jacobson .............. G01V 5/101 166/250.01 |
| 2005/0246297 | A1 * | 11/2005 | Chen .............. G06N 3/086 706/15 |
| 2006/0075223 | A1 | 4/2006 | Bade et al. |
| 2006/0131016 | A1 * | 6/2006 | Snoga .............. E21B 47/026 166/254.2 |
| 2006/0192096 | A1 | 8/2006 | Radtke et al. |
| 2006/0226351 | A1 | 10/2006 | Stoller et al. |
| 2006/0284066 | A1 * | 12/2006 | Jacobson .............. G01V 5/101 250/269.6 |
| 2008/0308720 | A1 | 12/2008 | Ferguson |
| 2009/0045329 | A1 | 2/2009 | Stoller |
| 2011/0112810 | A1 | 5/2011 | Scoullar et al. |
| 2011/0204217 | A1 | 8/2011 | Oraby et al. |
| 2011/0224906 | A1 | 9/2011 | Zhang et al. |
| 2011/0253448 | A1 | 10/2011 | Trinh et al. |
| 2011/0284731 | A1 | 11/2011 | Roscoe et al. |
| 2012/0016588 | A1 * | 1/2012 | Evans .............. G01V 5/104 702/8 |
| 2012/0126105 | A1 | 5/2012 | Evans et al. |
| 2012/0126106 | A1 | 5/2012 | Zhou et al. |
| 2012/0197529 | A1 * | 8/2012 | Stephenson .............. G01V 5/101 250/269.6 |
| 2012/0326048 | A1 | 12/2012 | Nikitin et al. |
| 2013/0206972 | A1 | 8/2013 | Zhou et al. |
| 2013/0264486 | A1 | 10/2013 | Bingham et al. |
| 2014/0001350 | A1 | 1/2014 | Beekman et al. |
| 2014/0042311 | A1 | 2/2014 | Zhou et al. |
| 2014/0339410 | A1 | 11/2014 | Zhou et al. |
| 2014/0343856 | A1 | 11/2014 | Zhou et al. |
| 2016/0003969 | A1 | 1/2016 | Zhou et al. |
| 2016/0024909 | A1 | 1/2016 | Han et al. |
| 2016/0154141 | A1 | 6/2016 | Moake |
| 2016/0349399 | A1 | 12/2016 | Zhou |
| 2017/0045639 | A1 | 2/2017 | Zhou |
| 2017/0176635 | A1 | 6/2017 | Kramer |
| 2017/0211382 | A1 | 7/2017 | Jacobson et al. |
| 2017/0293038 | A1 * | 10/2017 | Menge .............. G01T 1/20187 |
| 2017/0315260 | A1 | 11/2017 | Stoller |
| 2017/0362931 | A1 | 12/2017 | Homan et al. |
| 2018/0164469 | A1 | 6/2018 | Kuespert |
| 2018/0172876 | A1 | 6/2018 | Inanc et al. |
| 2018/0231683 | A1 | 8/2018 | Teague et al. |
| 2019/0025454 | A1 | 1/2019 | Galford |
| 2019/0033484 | A1 * | 1/2019 | Stoller .............. G01B 15/02 |
| 2019/0094410 | A1 | 3/2019 | Mendez et al. |
| 2020/0326451 | A1 | 10/2020 | Schmid et al. |
| 2022/0252753 | A1 | 8/2022 | Zhang et al. |
| 2022/0252754 | A1 * | 8/2022 | Zhan .............. G01V 5/102 |
| 2022/0252755 | A1 | 8/2022 | Zhan et al. |
| 2022/0308253 | A1 * | 9/2022 | Zhang .............. G01V 5/105 |
| 2022/0373484 | A1 * | 11/2022 | Rego .............. G01N 33/383 |
| 2023/0123713 | A1 | 4/2023 | Zhen et al. |
| 2023/0204813 | A1 | 6/2023 | Zhen et al. |
| 2024/0184011 | A1 * | 6/2024 | Zhan .............. E21B 49/00 |
| 2025/0116794 | A1 * | 4/2025 | Tkabladze .............. G01V 5/105 |

FOREIGN PATENT DOCUMENTS

| | | |
|---|---|---|
| CN | 102084271 A | 6/2011 |
| CN | 102428392 A | 4/2012 |
| CN | 102518431 A | 6/2012 |
| CN | 107288629 A | 10/2017 |
| CN | 107829728 A | 3/2018 |
| CN | 108643890 A | 10/2018 |
| CN | 110454147 A | 11/2019 |
| CN | 110612463 A | 12/2019 |
| CN | 111335886 A | 6/2020 |
| GB | 1582589 A | 1/1981 |
| WO | 2012064797 A2 | 5/2012 |
| WO | 2013148998 A1 | 10/2013 |
| WO | 2019060320 A2 | 3/2019 |
| WO | 2020219148 A1 | 10/2020 |

OTHER PUBLICATIONS

Zou, Liangzhi et al.; "Application of Core Calibration Logging in Establishing Logging Interpretation Model"; Journal of Oil and Gas Technology; vol. 33, No. 5; May 31, 2011; pp. 99-103.

Wores, Birhanu Tsegaye; "Elemental Analysis of Geological, Herbal and Food Samples Using Instrumental Neutron Activation Analysis (INAA)"; Addis Ababa University; Mar. 2015; pp. 1-50.

* cited by examiner

METHOD AND APPARATUS FOR OBTAINING FORMATION DENSITY

CROSS-REFERENCE TO RELATED APPLICATIONS

This application is a continuation-in-part of U.S. patent application Ser. No. 17/653,561, filed on Mar. 4, 2022, which is a continuation-in-part of U.S. patent application Ser. No. 17/333,834, filed on May 28, 2021, which claims the benefit of priority under 35 U.S.C. § 119 to U.S. provisional application Ser. No. 63/148,571, filed on Feb. 11, 2021, and U.S. provisional application Ser. No. 63/148,573, filed on Feb. 11, 2021, the content of each is incorporated herein by reference in its entirety.

BACKGROUND

1. Field of Technology

This disclosure provides methods and systems for nuclear well logging and formation evaluation, in particularly methods and systems for nuclear logging and data analysis to obtain real-time formation density using a nuclear logging tool having multiple dual-function detectors.

2. Description of Related Art

In oil and gas exploration, porosity, mineralogy, density, and gas/oil saturation are important formation parameters for evaluating the total oil/gas reserves in a field. Various wireline and LWD (Logging-While-Drilling) logging tools and methods have been developed for the measurement of downhole formation parameters.

Formation density is one of the key parameters in formation evaluation in oil and gas exploration. The density measurement tool was initially developed in the 1950s and was in use throughout the hydrocarbon industry by the 1960s. A radioactive source and a detector were utilized in the early tool design. The radioactive source, typically a directional Cs-137 source, emits gamma rays at 0.662 MeV. These gamma rays interact with electrons in the formation and are scattered back to the detector mainly due to the Compton effect. The number of scattered gamma rays that reach the detector placed at a certain distance is related to the formation's electron density, which itself is related to the formation's bulk density.

Modern density measurement tools often employ a radioactive source (e.g. Cs-137) and two detectors (e.g. a short-spaced NaI scintillation detector and a long-spaced NaI scintillation detector). The short-spaced detector (i.e., the near detector) has a much shallower depth of investigation than the long-spaced detector (i.e., the far detector) has and is used to measure the effect of the drilling fluid on the gamma ray detection. This result is then utilized to correct the long-spaced detector.

Radioactive sources are strictly regulated and disfavored in the oil and gas industry. Tools with a pulsed neutron generator have been proposed and developed. For example, U.S. Pat. No. 8,598,510B2 disclosed "source compensated formation density measurement method by using a pulsed neutron generator", where a pulsed neutron generator and three gamma ray detectors are used to detect initial inelastic gamma rays and backscattered inelastic gamma rays to obtain formation density.

The prior art system that uses three gamma ray detectors, or two gamma ray detectors with an epithermal detector may not be able to obtain high precise formation density. One of the reasons is that the space distribution of neither fast neutrons nor gamma rays has a linear relationship with the source-to-detector distance. There is a need for tools and methods that enable more precise density measurements, which requires the space and energy distributions of both fast neutrons and inelastic gamma rays, preferably at the same locations.

SUMMARY

This summary is provided to introduce a selection of concepts in a simplified form that are further described below in the detailed description. It is not intended to identify key features or essential features of the claimed subject matter, nor is it intended to be used as an aid in determining the scope of the claimed subject matter.

Disclosed herein are methods and systems to obtain more accurate formation density measurement using a pulsed neutron generator and two or more, preferably three, dual-function detectors. The dual-function detectors detect both neutrons and gamma rays simultaneously. The fast neutrons obtained at the near detector, the middle detector and the far detector are used to obtain fast neutron space, time and energy distribution. The inelastic gamma rays obtained at the near detector, the middle detector and the far detector are mainly the initial inelastic gamma rays, backscattered inelastic gamma rays. The measured fast neutron space, time and energy distribution, together with initial inelastic gamma rays at the near detector, backscattered inelastic scattering at the middle detector and the far detector, are then utilized to obtain the formation density. These methods and systems can be applied to both wireline and logging-while-drilling operations.

According to one of the embodiments in this disclosure, a method for evaluating a formation density of a subterranean formation includes a plurality of steps. First, a nuclear logging tool is deployed into the subterranean formation. The nuclear logging tool has one or more neutron sources and two or more dual-function detectors configured to simultaneously detect both neutrons and gamma rays. Next, the one or more neutron sources emit neutrons into the subterranean formation, and neutrons and gamma rays from the subterranean formation are detected at the three or more detectors to form electric signals. Further, electric signals from neutrons and gamma rays for each of the two or more detectors are separated. The detector count rates of total neutrons, fast neutrons and thermal neutrons at the three or more detectors are obtained and utilized to obtain space, time and energy dependent fluence rates for fast neutrons and thermal neutrons. The detector count rates of inelastic gamma rays at the two or more detectors are obtained.

The formation density value can be obtained based on a first ratio of the gamma ray count rate at the far detector and the gamma ray count rate the near detector, a second ratio of the gamma ray count rate at the middle detector and the gamma ray count rate at the near detector, or a combination of the first ratio and the second ratio.

In some of the embodiments, there are three or more dual-function detectors, e.g., a near detector, a middle detector, and a far detector. The first formation density value is obtained based on a ratio of the gamma ray count rate the at the far detector and the gamma ray count rate the near detector. The second formation density value is obtained based on a ratio of the gamma ray count rate the at the middle detector and the gamma ray count rate the near detector. The formation density is a weighted average of the first formation density value and the second formation density value.

In still other embodiments, the gamma ray count rate at each detector is correlated and adjusted based on the fast neutron fluence rate.

BRIEF DESCRIPTION OF THE DRAWINGS

The teachings of the present invention can be readily understood by considering the following detailed description in conjunction with the accompanying drawings.

Figure 1A:
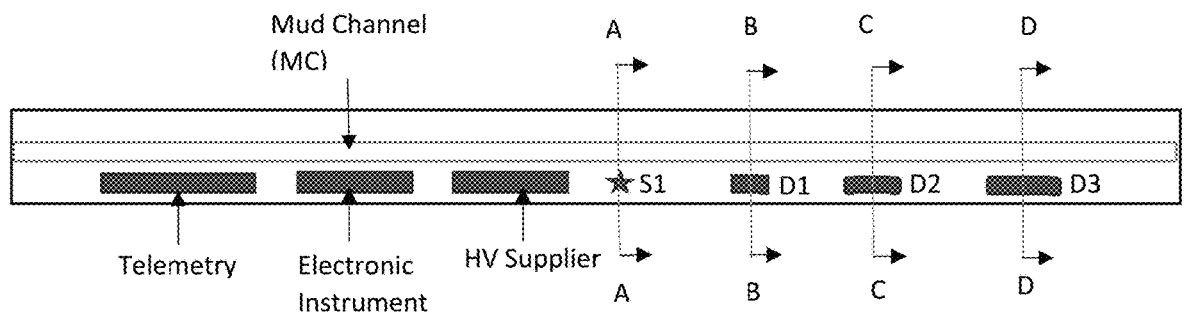
FIG. 1A, FIG. 1B, FIG. 1C, and FIG. 1D illustrate four exemplary configurations of a nuclear logging tool having one neutron source (S1) and three detectors (D1, D2, and D3) disposed along the longitudinal direction of the housing of the tool.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. References are made in detail to embodiments of the present disclosure, examples of which are illustrated in the accompanying drawings. Similar or like reference numbers may be used in the drawings and may indicate similar or like elements.

The features described herein may be embodied in different forms and are not to be construed as being limited to the embodiments described herein. Rather, the embodiments described herein and depicted in the drawings have been provided so that this disclosure will be thorough and complete and will convey the full scope of the disclosure to one of ordinary skill in the art, who may readily recognize from the following description that alternative embodiments exist without departing from the general principles of the disclosure.

Therefore, the scope of the disclosure is defined not by the detailed description, but by the claims and their equivalents, and all variations within the scope of the claims and their equivalents are to be construed as being included in the disclosure.

In this disclosure, unless otherwise noted, a detector refers to a dual-function detector that can detect both neutrons and gamma rays. Such a detector employs scintillation crystals such as $Cs_2LiYCl_6$ (CLYC) or $Cs_2LiLaBr_6$ (CLLB) and associated electronics, e.g., PMT. The detectors may be actively cooled or not actively cooled when deployed downhole. For example, a detector using CLLB and high-temperature PMT can be used at a high temperature without additional cooling.

FIGS. 1A to 1D are schematic illustrations (not to scale) of four exemplary configurations of a cylindrical nuclear logging tool having a neutron source (S1) and three dual-function detectors (D1, D2, D3) disposed along the housing of the logging tool suitable for logging-while-drilling (LWD) operations. A mud channel (MC) is disposed along the axis of the logging tool while the detectors are eccentrically disposed along the longitudinal direction of the tool. FIG. 1A also shows a high voltage power supply (HV), an electronic instrument, e.g., a controller, for sending instructions, receiving, and processing data from the neutron source and the detectors, as well as a telemetry for transmitting data between the logging tool and surface. The high voltage power supply provides power to detectors (D1, D2, D3) and to the pulsed neutron source (S1). The power supply, the electronic instrument, and telemetry are required but not shown in FIGS. 1B-1D for simplicity.

As shown in the figures, D1 is the near detector that has the shortest distance in longitudinal direction to the neutron source, D3 is the far detector having the longest longitudinal distance to the neutron source, and D2 is the middle detector that has a longitudinal distance that is in the middle.

Figure 1B:
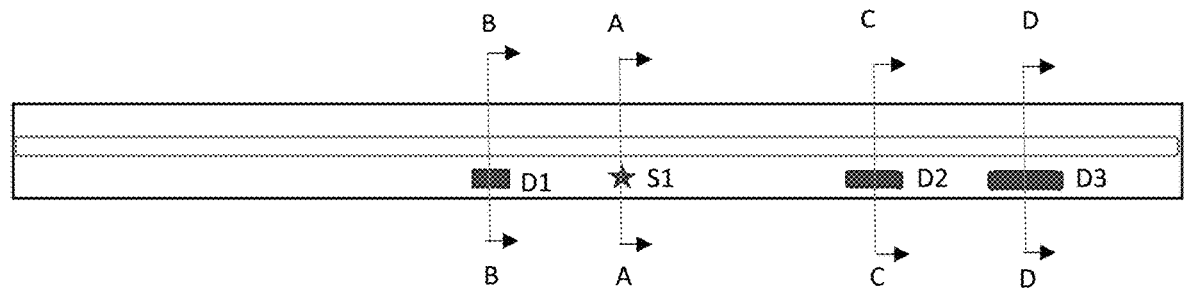
Figure 1C:
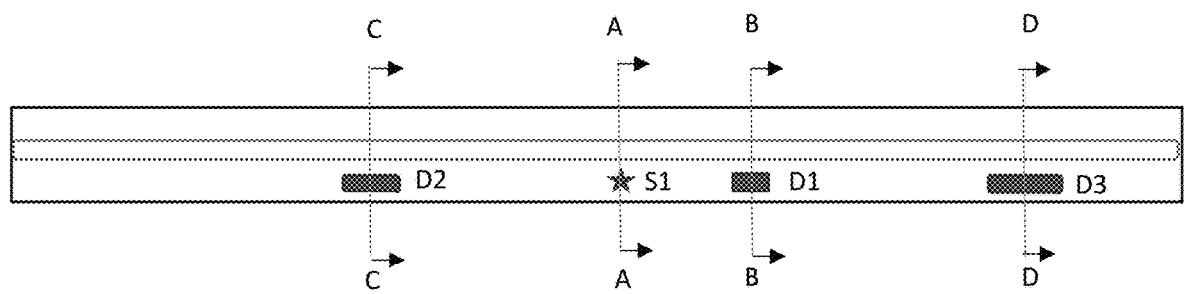
Figure 1D:
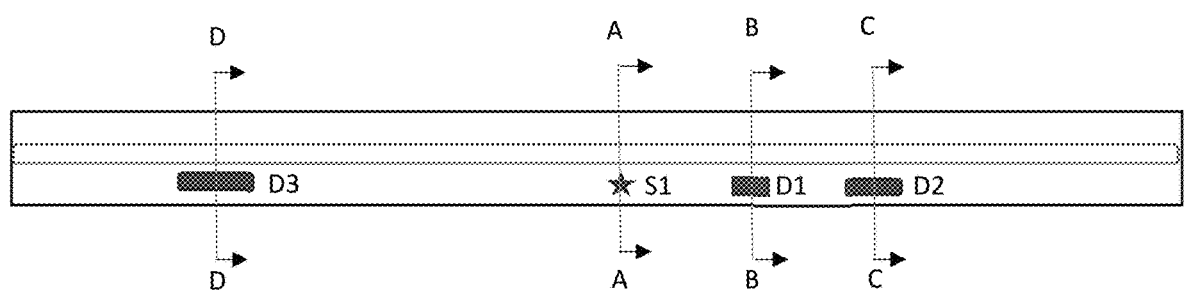

In FIG. 1A, all three detectors reside on one side of the neutron source along the logging tool. The one side can be either the proximal side or the distal side of the neutron source. The proximal side is the side of the nuclear logging tool that is closer to the surface when it is deployed downhole while the distal side is farther away from the surface. The high voltage power supply provides power to detectors (D1, D2, D3) and to the pulsed neutron source (S1). The signals from detectors are processed by the electronic instruments and measurements/data are collected and transmitted by telemetry. In FIGS. 1B, 1C, and 1D, both the distal side and the proximal side of the neutron source has at least one detector disposed thereto.

In wireline logging, the tool can be installed in a sonde, which does not contain a mud channel. Detectors can be installed either along or off the axis of the tool body. Power and control signals can also be provided to the logging tool from the surface while data from the logging tool can be transmitted to the surface via the wireline cable.

The neutron source S1 in each logging tool depicted in FIGS. 1A to 1D is a pulsed neutron generator. The pulsed neutron source may be a Deuterium-Tritium (D-T) pulsed neutron generator, which can be operated in a variety of pulse schematics (e.g., frequency, duty time) in a pulse mode. For example, the frequency of neutron pulses may be about 10 kHz (the period is 100 μs) and the neutron duty time may be about 20 μs. Depending on the methods and measurements, the D-T neutron generator may also be operated in a continuous mode. In that case, the neutron generator is activated frequent enough so that neutrons are emitted continuously. Neutrons from a D-T neutron generator has an initial energy of about 14.1 MeV.

The neutron source S1 and detectors D1, D2, and D3 as depicted in FIGS. 1A-1D only show their relative positions along the longitudinal direction of the housing of the tool but not their positions in the radial direction in a cross-section of the tool housing.

Figure 2A:
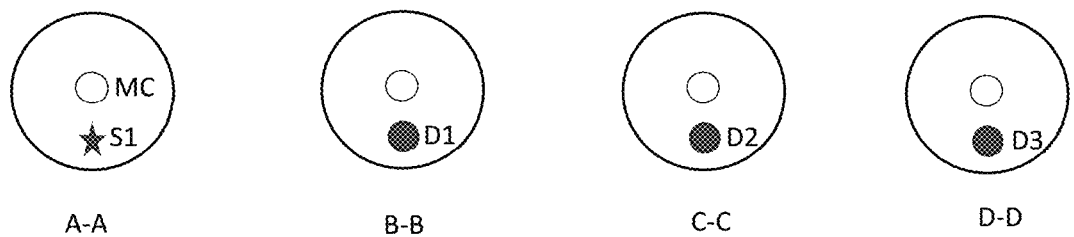
FIG. 2A, FIG. 2B, and FIG. 2C show cross-sectional views of exemplary nuclear logging tools having S1, D1, D2, and D3.
Figure 2B:
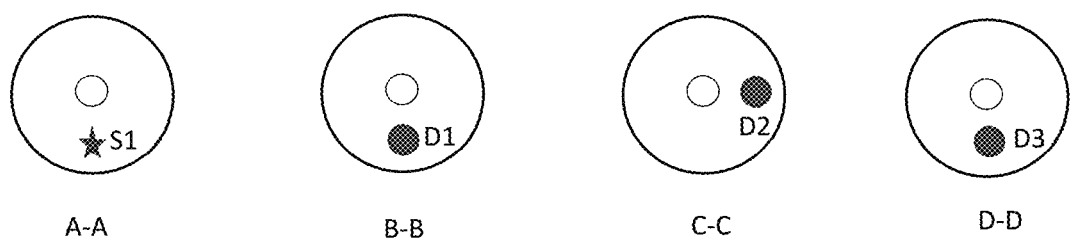
Figure 2C:
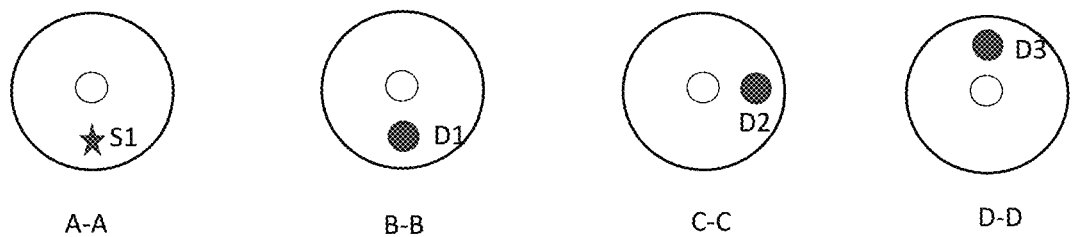

In certain embodiments, S1, D1, D2, and D3 can be disposed at the same radial or different radial directions, i.e., having the same or different toolface angles when deployed in the formation. FIGS. 2A, 2B, and 2C show exemplary cross-sectional views in the directions of A-A, B-B, C-C, and D-D as shown in FIGS. 1A to 1D. S1, D1, D2, and D3 in FIG. 2A are disposed at same toolface angle. In FIG. 2B, however, S1, D1, and D3 have the same toolface angle while D2 is at a different toolface angle. In FIG. 2C, S1 and D1 have the same toolface angle while each of D2 and D3 has a different toolface angle.

Figure 3A:
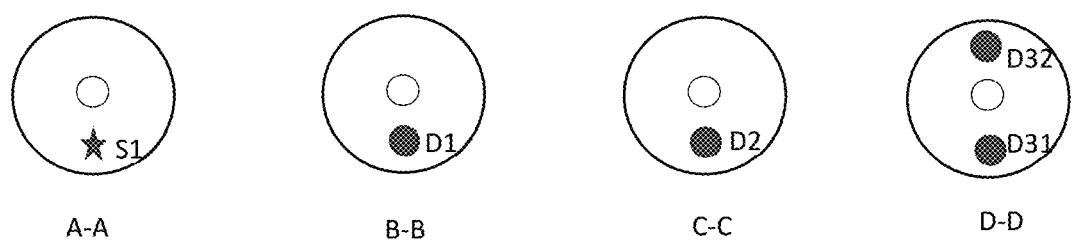
FIG. 3A and FIG. 3B show cross-sectional views of exemplary nuclear logging tools having four (D1, D2, D31, and D32) and six detectors (D1, D21, D22, D31, D32, and D33), respectively.
Figure 3B:
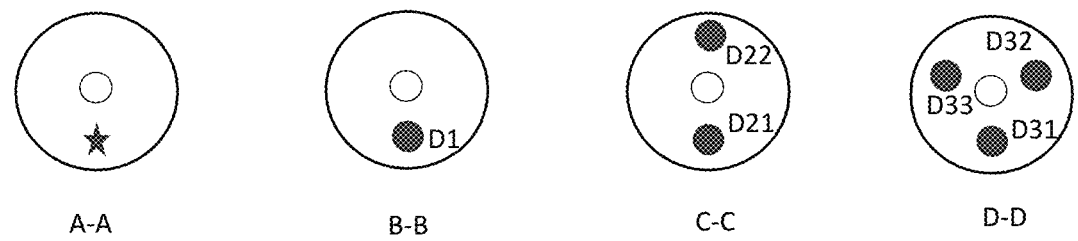

Other embodiments of the logging tool may have more than three detectors. For example, FIG. 3A depicts a variation of the logging tool in FIG. 1A that has four detectors—D1, D2, D31, and D32. D31 and D32 have approximately the same distance from S1 but are disposed at two different toolface angles. Likewise, FIG. 3B depicts another variation of tool in FIG. 1A, which has six detectors: D1, D21, D22, D31, D32, and D33. In this embodiment, D21 and D22 are disposed opposite to each other on the cross-sectional area of the logging tool, i.e., the toolface angle of D21 and D22 is 0° and 180°, respectively. D31, D32, and D33 are disposed 120° apart on the cross-sectional area of the logging tool, i.e., a difference in the toolface angles of any two among D31, D32, and D33 is 120°. Having different toolface angles allows detectors to preferentially receive neutrons and gamma-rays at certain incident angles from the formation. It also increases the detection efficiency of neutrons and gamma rays by increasing the total count rate of all the detectors.

Further, in FIG. 3A, D31 and D32 have substantially the same distance from S1. In FIG. 3B, middle detectors D21 and D22 have substantially the same distance from S1 while far detectors D31, D32, and D33 have substantially the same distance from S1. "Substantially the same distance" means the distances from S1 to the center of scintillators of the detectors (e.g., D31 and D32) is about the same. For example, the difference is less than ½" or ¼". By this arrangement, the middle detectors as a whole and far detectors as a whole have higher count rates than when only one middle detector or only one far detector is used. Accordingly, the neutron generator S1 can be of a less powerful source, which may not be subject to stringent regulations as more powerful neutron sources are subject to. In addition, the count rate of individual detectors can separately be recorded and processed. The differences of various detectors in distance and in toolface angles can be used to obtain formation information in specific azimuthal directions.

In some embodiments, the logging tool has multiple shields that can absorb neutrons and gamma-rays (not shown). The shields can be placed in the logging tool between the neutron source and the detectors so that the detectors receive neutrons and gamma-rays coming from the formation rather than traveling through the logging tool itself. Alternatively, the detectors can also be partially shielded by the shield material that absorb both neutrons and gamma rays from certain directions.

The shield is made of or contains one or more materials that can effectively attenuate both neutrons and gamma rays. The shield material can contain light elements for fast neutrons, such as hydrogen (H) in polyethylene, and heavy elements having high thermal neutron absorption cross sections, including metals such as gadolinium (Gd), samarium (Sm), metal oxides such as $Gd_2O_3$, $Sm_2O_3$, $B_2O_3$, alloys containing Gd or Sm with other heavy metals Fe, Pb, or W, or materials containing boron, such as tungsten borides (WB, $WB_2$, etc.).

The shield may be a stand-alone metal piece inserted in the logging tool, or an integral part of the detector casing. For example, the portion of the detector casing facing inward to the logging tool can be made of the shield material while the portion facing the formation is made of a material that is transparent to neutrons and gamma rays, forming a window that neutrons and gamma rays can travel through. As such, neutrons and gamma-rays from certain incident angles may be absorbed by the shield material while those travel through the window are received by the detector. Therefore, the detector can be more sensitive to certain incident angles by adjusting the size and orientation of the window in the detector casing. During operation, data collected by various detectors may produce direction-specific formation properties, which can be used to guide directional drilling.

Figure 4A:
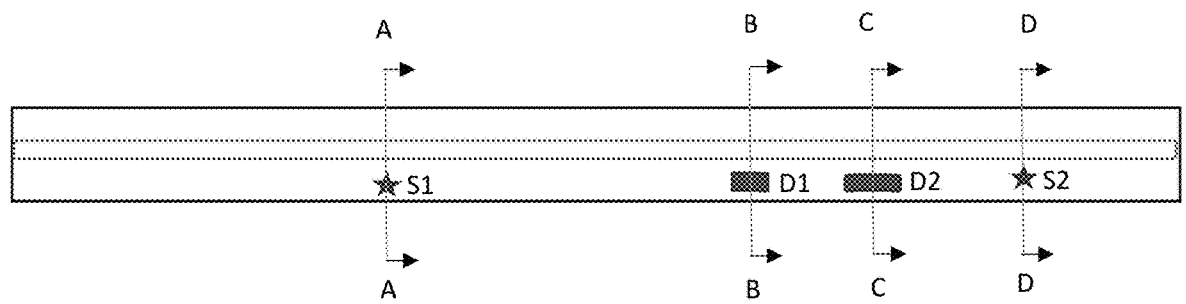
FIG. 4A is an embodiment of the nuclear logging tool having two neutron sources (S1, S2) and two detectors (D1, D2)

The nuclear logging tool may have more than one neutron sources. FIG. 4A shows a further embodiment of the logging tool having two neutron sources (S1 and S2), one at the proximal end and the other at the distal end while two detectors (D1 and D2) are arranged between S1 and S2. Alternatively, S1 and S2 can be arranged in tandem and disposed near one end of the logging tool while D1 and D2 arranged in tandem near the other end, as the engineering considerations require. In both embodiments, the distance between S1 and D1 is $d_1$, the distance between S1 and D2 is $d_2$, the distance between S2 and D2 is $d_3$, while the distance between S2 to D1 is $d_4$. When S1 and S2 are both pulsed neutron generators, they can be alternately turned ON or OFF, thereby inducing neutrons and gamma-rays from the formation alternately, which are received by D1 and D2. Since there are four different source-to-detector distances ($d_1$ to $d_4$), the data generated in D1 and D2 may be better compensated than tools with only two or three source-to-detector distances for near wellbore effects, such as borehole size, tool standoff, mud weight and/or salinity, casing size, cement thickness, etc. As a result, the obtained formation parameters could be more accurate.

Figure 4B:
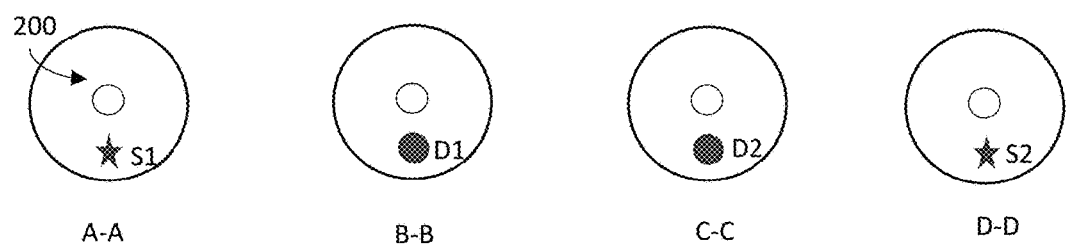
FIG. 4B and FIG. 4C provide cross-sectional views of exemplary configurations of this embodiment.
Figure 4C:
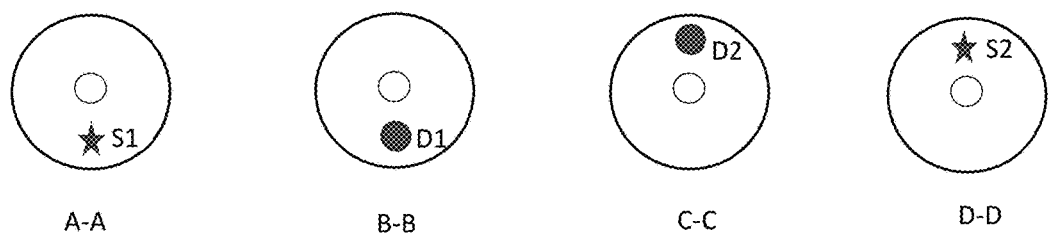

FIG. 4B and FIG. 4C illustrate two exemplary embodiments of the logging tool, where the two sources and two detectors can be arranged at same toolface angle or at different toolface angles. When, as in FIG. 4B, the sources and detectors have the same toolface angle, the measurement covers the same sector in the formation at any given time. When, as in FIG. 4A, the sources and detectors may have different toolface angles, the data generated in D1 and D2 reflect different sectors of the formation, which can reveal differences amongst various formation sectors at any given time by comparing the measurements from D1 and D2.

Figure 5A:
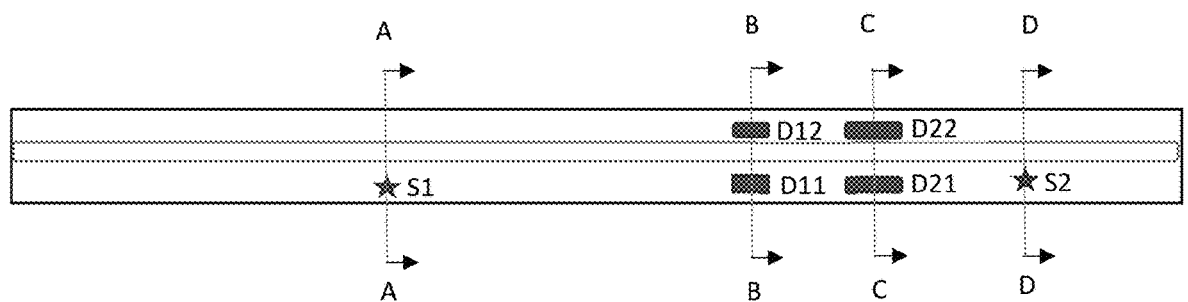
FIG. 5A is a further exemplary embodiment of the nuclear logging tool having two neutron sources (S1, S2) and four detectors (D11, D12, D21, D22)
Figure 5B:
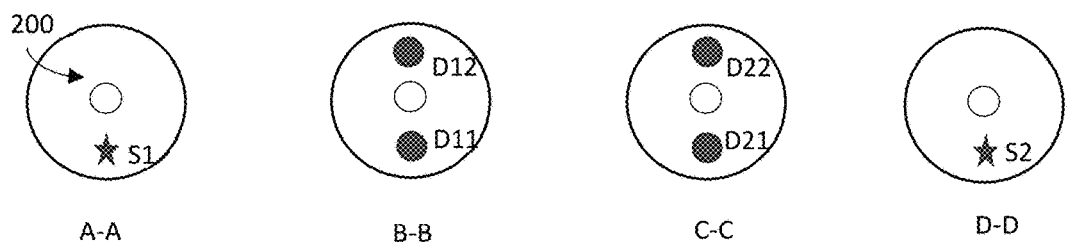
FIG. 5B provides cross-sectional views of this embodiment.

FIGS. 5A and 5B illustrate a logging tool that has four detectors (D11, D12, D21, D22) and two neutron sources (S1 and S2). Note that the pair of detectors D11 and D12 (as well as D21 and D22) are disposed at substantially the same distance from S1 or S2. As indicated before, having more than one detector at a certain distance increase the count rate at that distance so that a less powerful neutron source may be viable. The count rate of one far detector may be too low to provide reliable measurement data. By using two or more far detectors, the count rate can be significantly increased so that reliable measurement results can be obtained by processing data from the multiple far detectors as a whole.

In some embodiments, S1 and S2 can be turned ON or OFF simultaneously. Doing so increases the count rate of D1 and D2, thereby reducing the statistical measurement uncertainty.

In still another embodiment, S1 and S2 can be same or different types of neutron generators. For example, Both S1 and S2 can be D-T neutron generators or D-D neutron generators, or S1 can be a D-T neutron generator while S2 can be a D-D neutron generator.

Figure 6:
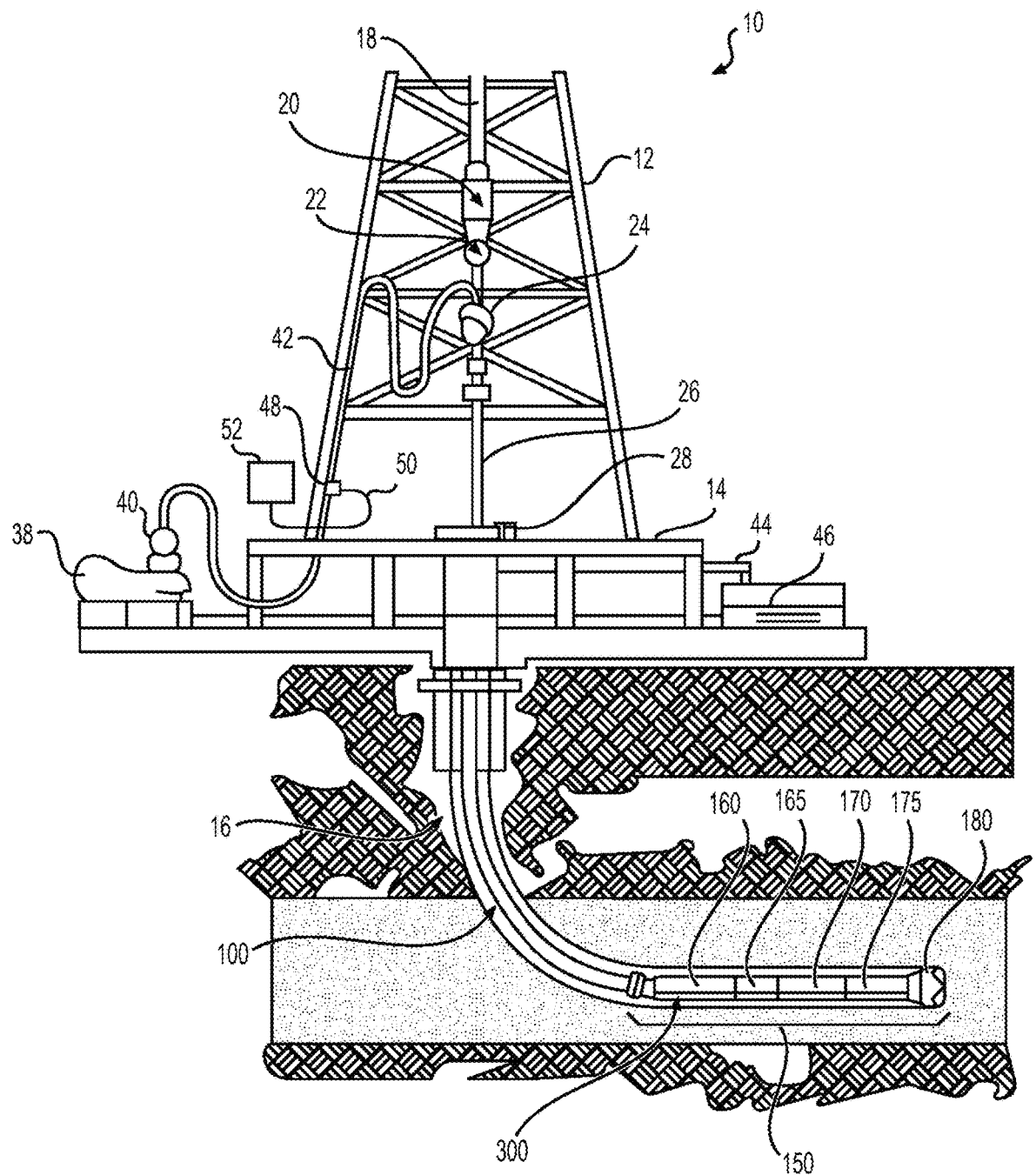
FIG. 6 is a diagram of an exemplary drilling system that implements an embodiment of the current disclosure.

The logging tool can be a part of a wireline logging tool or be included in a downhole assembly as a LWD logging tool in a drilling operation. FIG. 6 is a diagram of an oil drilling system 10 used in the directional drilling of borehole 16. The oil drilling system 10 may be used for drilling on land as well as beneath the water. The borehole 16 is drilled into the earth formation using a rotary drilling rig that includes a derrick 12, drill floor 14, draw works 18, traveling block 20, hook 22, swivel joint 24, kelly joint 26 and rotary table 28. A drill string 100 includes a plurality of drill pipes that are serially connected and secured to the bottom of the kelly joint 26 at the surface. The rotary table 28 is used to rotate the entire drill string 100 while the draw works 18 is used to lower the drill string 100 into the bore hole 16 and apply controlled axial compressive loads. The bottom whole assembly 150 is disposed at the distal end of the drill string 100.

The drilling fluid (also referred to as mud) is usually stored in mud pits or mud tanks 46, and is transferred using a mud pump 38, which forces the drilling fluid to flow through a surge suppressor 40, then through a kelly hose 42, and through the swivel joint 24 and into the top of the drill string 100. The drilling fluid flows through the drill string 100 at about 150 gallons per minute to about 600 gallons per minute and flows into the bottom whole assembly 150. The drilling fluid then returns to the surface by traveling through the annular space between the outer surface of the drill string 100 and the bore hole 16. When the drilling fluid reaches the surface, it is diverted through a mud return line 44 back to the mud tanks 46.

The pressure required to keep the drilling fluid in circulation is measured by a pressure sensitive transducer 48 on the kelly hose 42. The pressure sensitive transducer detects changes in pressure caused by the pressure pulses generated by a pulser. The magnitude of the pressure wave from the pulser may be up to 500 psi or more. The measured pressure is transmitted as electrical signals through transducer cable 50 to a surface computer 52, which decodes and displays the transmitted information. Alternatively, the measured pressure is transmitted as electrical signals through transducer cable 50 to a decoder that decodes the electrical signals and transmits the decoded signals to a surface computer 52, which displays the data on a display screen.

As indicated above, the lower part ("distal part") of the drill string 100 includes the bottom hole assembly (BHA) 150, which includes a non-magnetic drill collar with a MWD system (MWD assembly or MWD tool) 160 installed therein, logging-while drilling (LWD) instruments sub 165 containing LWD instruments, a downhole motor 170, a near-bit measurement sub 175, and the drill bit 180 having drilling nozzles (not shown). The drilling fluid flows through the drill string 100 and is output through the drilling nozzles of the drill bit 180. During the drilling operation, the drilling system 10 may operate in the rotary mode, in which the drill string 100 is rotated from the surface either by the rotary table 28 or a motor in the traveling block 20 (i.e., a top drive). The drilling system 10 may also operate in a sliding mode, in which the drill string 100 is not rotated from the surface but is driven by the downhole motor 170 rotating the drill bit 180. The drilling fluid is pumped from the surface through the drill string 100 to the drill bit 180, being injected into an annulus between the drill string 100 and the wall of the bore hole 16. The drilling fluid carries the cuttings up from the bore hole 16 to the surface.

In one or more embodiments, the MWD system 160 may include a pulser sub, a pulser driver sub, a battery sub, a central storage unit, a master board, a power supply sub, a directional module sub, and other sensor boards. In some embodiments, some of these devices may be located in other areas of the BHA 150. One or more of the pulser sub and pulser driver sub may communicate with the pulser 300, which may be located below the MWD system 160. The MWD system 160 can transmit data to the pulser 300 so that the pulser 300 generates pressure pulses.

The non-magnetic drill collar houses the MWD system 160, which includes a package of instruments for measuring inclination, azimuth, well trajectory (bore hole trajectory), etc. The nuclear logging tool and associated electronic components may be located in LWD instrument sub 165. The nuclear logging tool and other well logging instruments may be electrically or wirelessly coupled together, powered by a battery pack or a power generator driven by the drilling fluid. All information gathered may be transmitted to the surface via in the form of pressure pulses generated by the pulser 300 through the mud column in the drill string.

The near-bit measurement sub 175 may be disposed between the downhole motor 170 and drill bit 180. The nuclear logging tool may alternatively be installed in the near-bit measure sub 175 to provide more accurate real-time formation parameters to guide directional drilling. The data may be transmitted through the cable embedded in the downhole motor 170 to the MWD system 160 in the bottom whole assembly 150.

Figure 7:
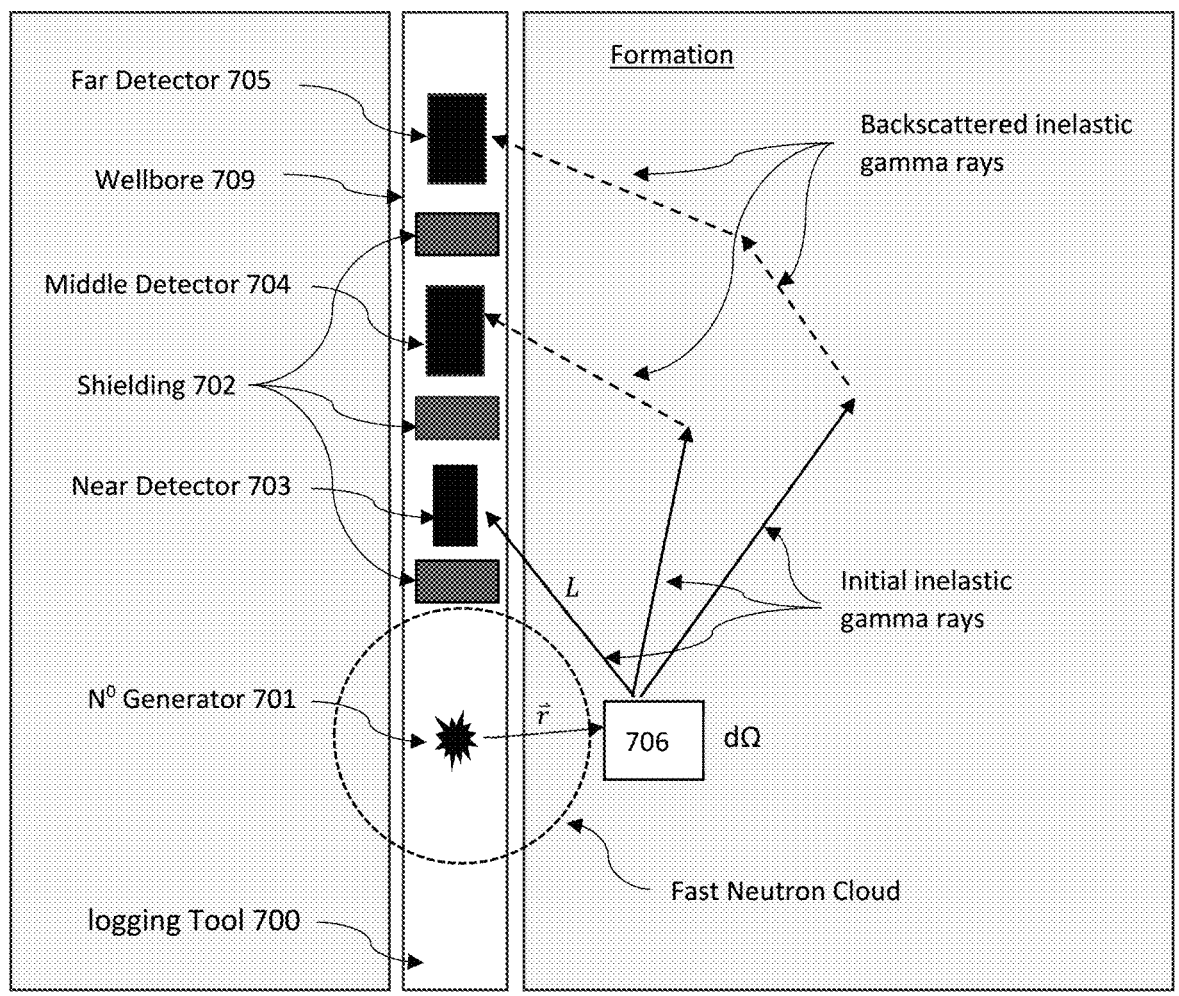
FIG. 7 is a schematic diagram illustrating measurement of inelastic and backscattered gamma signals in a downhole formation using a nuclear logging tool of the current disclosure.

In one embodiment of the current disclosure, a variety of formation parameters can be obtained using a logging tool having a D-T neutron generator and three dual-function detectors. FIG. 7 illustrates such a logging tool 700 operating in a wellbore 709. In the logging tool 700, the neutron generator 701, e.g., a D-T neutron pulse generator, is separated by a neutron shield 702 from the near detector 703, the middle detector 704, and the far detector 705. FIG. 7 shows that the neutron pulse generator 701 sends neutron pulses into the formation. The neutrons reach a spot 706 in the formation having a small volume of $d\Omega$. The spot 706 is defined by a vector of $\vec{r}$, from the neutron pulse generator 701 and is at a distance of L from the near detector and a different distance from the middle detector. The formation material at 706 reflects fast neutrons, which are scattered inelastically to generate inelastic gamma rays or thermal neutrons, causing emission of capture gamma rays. The near detector 703, due to its closeness to the neutron source, mainly received initial inelastic gamma rays. The middle detector 704 and the far detector 705 received mostly backscattered inelastic gamma rays. The backscattered inelastic gamma rays travel a longer path to arrive at the detectors so that their rate count differs from that of the initial inelastic gamma rays. Some of the neutrons and gamma rays reach the detectors and are registered as count rates and energy spectra.

Figure 8:
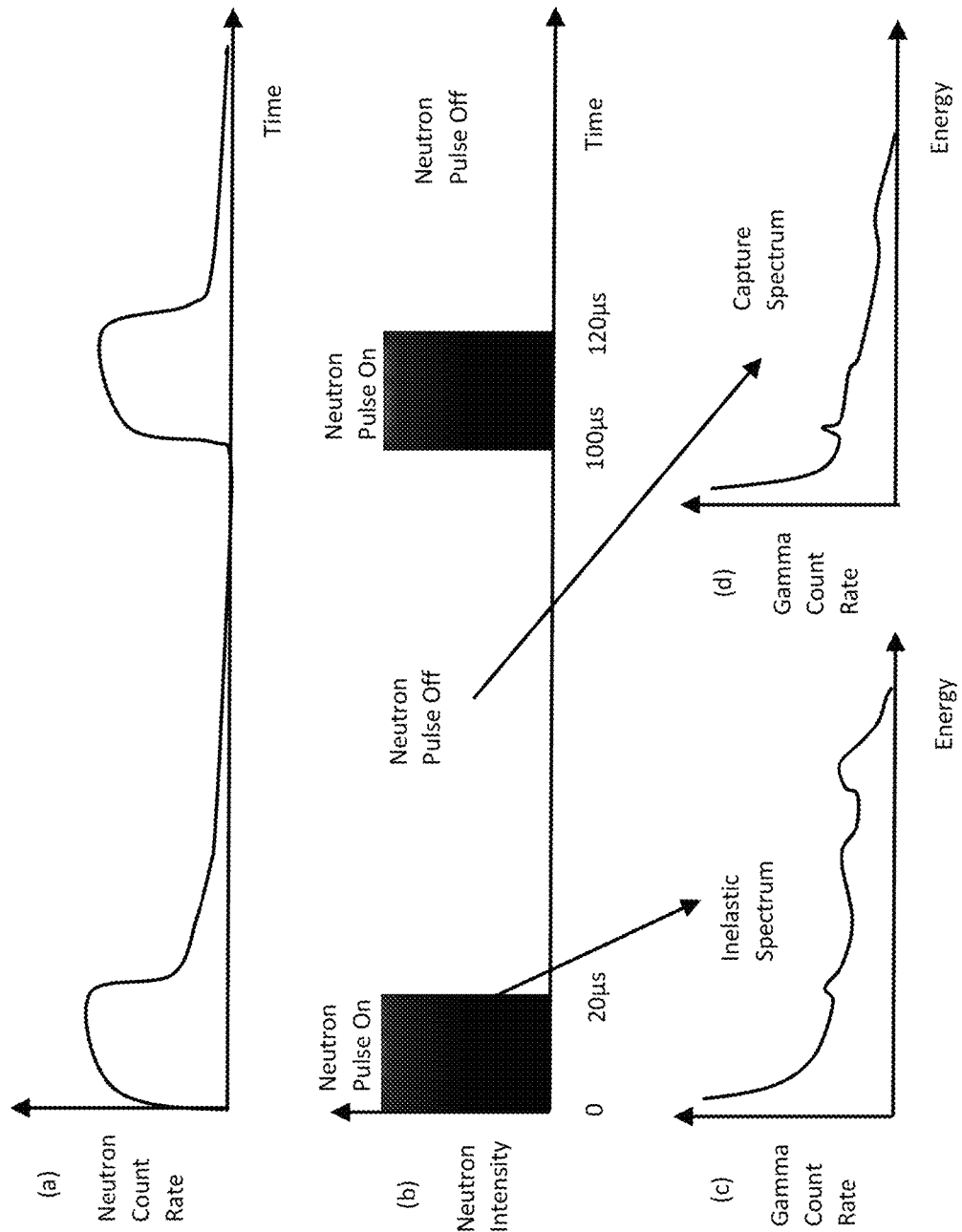
FIG. 8 shows schematics of neutron pulses, as well as neutron count rates, inelastic spectrum, capture spectrum of neutron-induced gamma rays in response to the ON and OFF of the neutron pulses.

In one of the embodiments, using a gate signal synchronized with ON-OFF events of high voltage in the pulsed neutron generator as a coincident event or an anti-coincident event, the gamma rays induced by fast neutron inelastic scattering during neutron pulses can be separately recorded from gamma rays induced by thermal neutron capture reaction between the neutron pulses. FIG. 8 shows schematics of neutron pulses, neutron count rates, as well as inelastic spectrum and capture spectrum of neutron-induced gamma rays. The frequency of neutron pulses is 10 kHz (the period is 100 μs) and the neutron duty time is 20 μs, as shown in FIG. 8, panel (b).

The neutron count rates measured from each of the three detectors, shown in FIG. 8, panel (a), are utilized to obtain formation porosity. Neutrons from three detectors may be further separated according to whether the neutron pulse is ON or OFF, which serves as a coincident or anti-coincident signal to neutrons from the three detectors so that, during the neutron pulses (when neutron pulse is ON), neutrons are recorded mainly as fast neutrons. Between the neutron pulses (when neutron pulse is OFF), neutrons are recorded as thermal neutrons. Fast neutrons and thermal neutrons recorded at three detectors can be used to obtain fast neutron space, time and energy dependent distribution and thermal neutron space, time and energy dependent distribution. The neutrons from each detector may also be recorded together. In that case, all neutrons (from thermal neutrons to fast neutrons) are used to obtain the neutron space, time and energy dependent distribution.

Gamma rays from three detectors may be further separated according to whether the neutron pulse is ON or OFF, which serves as a coincident or anti-coincident signal to gamma rays from the three detectors so that during the neutron pulses (neutron pulse is ON), gamma rays are mainly recorded as inelastic spectrum induced by inelastically scattered fast neutrons, shown in FIG. 8, panel (c). Between the neutron pulses (neutron pulse is OFF), gamma rays are recorded as capture spectrum induced by thermal neutrons, shown in FIG. 8, panel (d). Proper time windows are selected so that gamma rays measured in the capture time window are from thermal neutron capture reactions and most gamma rays measured in the inelastic time window are from fast neutron inelastic scattering.

Background noises in various detectors may be measured while the neutron generator is OFF for a period of time and can be subtracted from the total signals of either neutrons or gamma rays. Neutron background measured during the neutron pulses may be further subtracted to get "pure" fast neutrons by using a small percentage of the measured neutrons between the neutron pulses. Similarly, the capture gamma rays measured during the neutron pulses may be further subtracted to get "pure" inelastic spectrum by using a small percentage of the measured capture spectrum between neutron pulses.

Gamma rays detected by each detector can also be recorded in one energy spectrum (e.g., a total energy spectrum), whether they are initiated from neutron inelastic scattering or neutron capture reactions. Accordingly, several formation measurements are feasible, such as the formation porosity, elemental concentrations, and formation oil/gas saturation, but one may not be able to get formation density, as the spectrum of inelastic gamma rays, which are less dependent on the formation type, porosity and have smaller space distributions, are needed to obtain the formation density for a D-T pulsed neutron generator-based measurement system.

Figure 9:
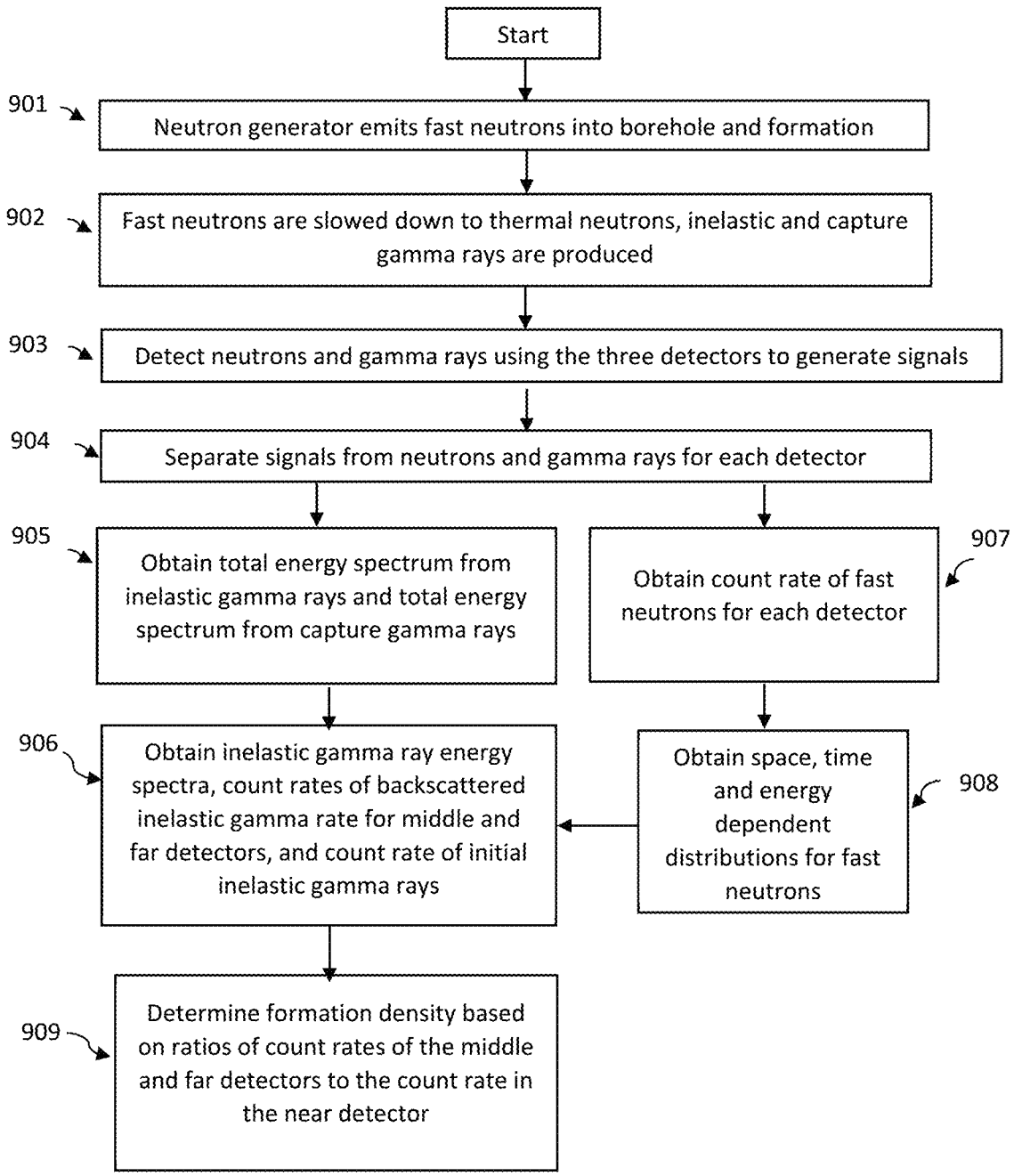
FIG. 9 is a flow diagram showing exemplary methods to obtain formation density according to the current disclosure.

FIG. 9 is an exemplary workflow showing the steps in the processing of data from the logging tool having one D-T neutron generator and three detectors (the near detector, the middle detector, and the far detector) to obtain real-time formation density. In Step 901, the D-T neutron generator emits neutron pulses into the formation surrounding the measurement tool. In Step 902, fast neutrons are slowed down to become thermal neutrons. Inelastic gamma rays and capture gamma rays are produced.

In Step 903, neutrons and neutron-induced gamma rays are detected by the three detectors. The initial inelastic gamma rays are detected primarily by the near detector due to its proximity to the neutron source while the backscattered gamma rays are detected by the middle detector and the far detector. In Step 904, signals from neutrons and neutron-induced gamma rays are distinguished from each other, e.g., using the pulse shape discrimination (PSD) technique. In Step 907, the neutron signals from the three detectors are then utilized to obtain the total count rates ($CRN_n$, $CRN_m$, $CRN_f$), fast neutron count rates ($CRFN_n$, $CRFN_m$, $CRFN_f$) thermal neutron count rates ($CRTN_n$, $CRTN_m$, $CRTN_f$). The space, time and energy dependent distributions are then obtained for fast neutrons and optionally thermal neutrons.

On the other hand, in Step 905, the total energy spectrum from inelastic gamma rays and the total energy spectrum from capture gamma rays are obtained after the separation in Step 904, e.g., according to the timing of the neutron pulses shown in FIG. 8. In Step 906, the count rates of the backscattered gamma rays in the middle and far detectors are obtained. The count rate of the initial inelastic gamma rays in the near detector is obtained. The information is correlated with the neutron fluence rate for each detector obtained in Step 908. In Step 909, the ratio of the gamma ray count rates between the far detector and the near detector can be used to determine a first formation density value. Likewise, the ratio of the gamma ray count rates between the middle detector and the near detector can be used to determine a second formation density value. The formation density is obtained as a weighted average of the first and the second formation density values. Alternatively, both ratios can be combined to according to an algorithm to produce a weighted ratio, which is then used to calculate formation density.

Figure 10:
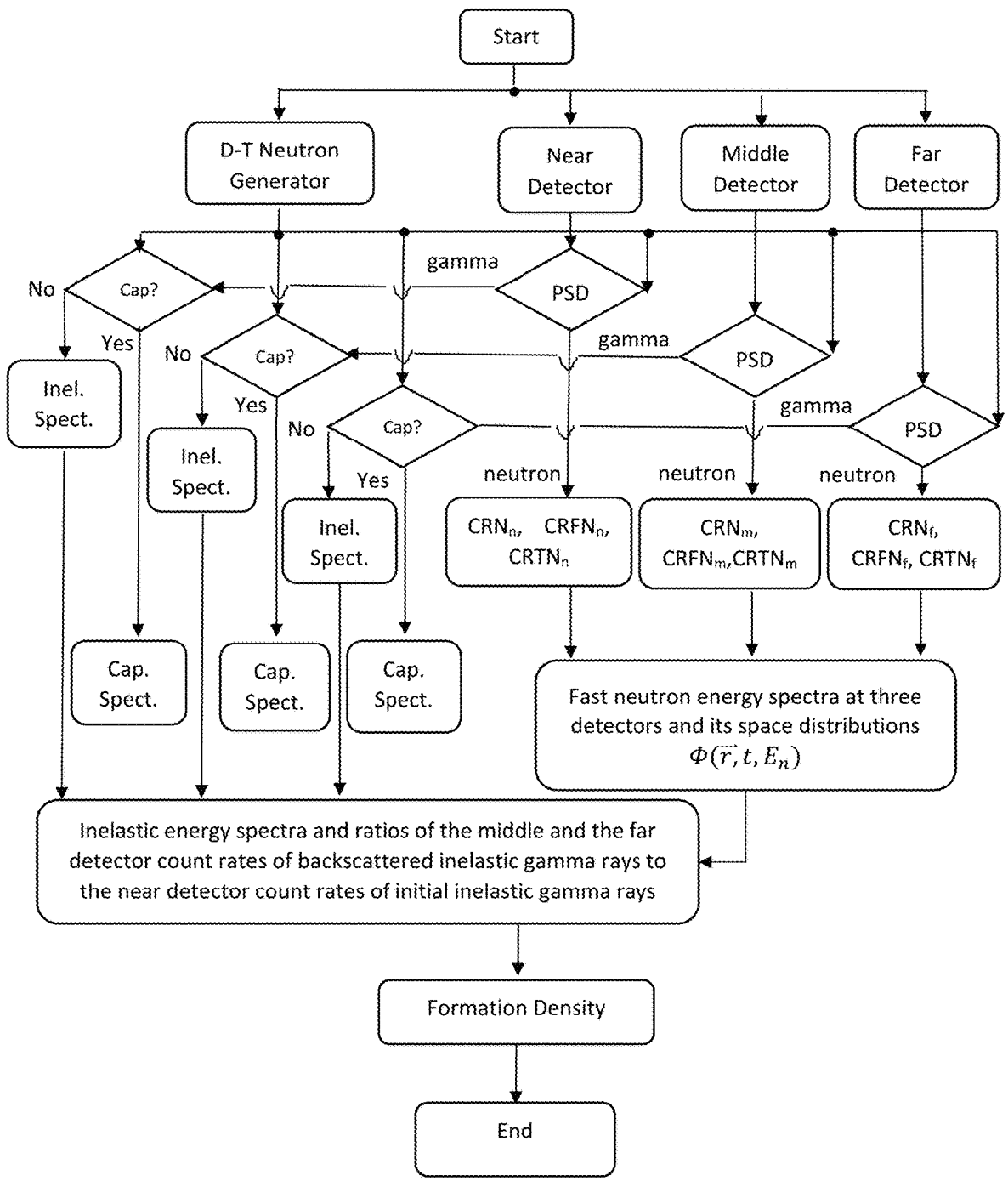
FIG. 10 is a block diagram showing exemplary methods to obtain formation density according to the current disclosure.

FIG. 10 presents the embodiment of this disclosure using mathematical symbols and equations, carried out using an exemplary logging tool having a D-T neutron generator and three dual-function detectors.

Formation density in the formation can be obtained by measuring the energy spectrum of gamma rays from both neutron inelastic scattering and neutron capture reactions, using the same tool. Neutron pulses from the D-T neutron generator are timed as descried in relation to FIG. 8. Neutron-induced gamma ray signals from the three detectors, after being separated from neutron signals according to the timing of the pulses, are further separated into gamma ray signals from thermal neutron capture reactions and gamma ray signals from fast neutron inelastic scattering. The inelastic spectrum is the basis for detecting Mg, Fe, S, C, Al, Si, Ca, and O elements. The capture spectrum provides information on other elements, such as Mg, S, Ti, Al, K, Ca, Si, Gd, Fe, Cl, H elements.

Since the three detectors in the logging tool detect both neutrons and gamma rays simultaneously at three different locations while the logging tool as a whole is moving along the wellbore, the neutron count rates from three detectors (CRN, CRFN, CRTN at the near detector, the middle detector, or the far detector) can be used to derive the space, time and energy dependent distribution of the fast neutrons as well as the thermal neutrons, represented by $\Phi(\vec{r},t,E_n)$.

Equation 1 shows the mathematical relation between a detector count rate of gamma rays from either fast neutron inelastic scattering or thermal neutron capture reaction with a target element in near wellbore region.

$$C_i(t, E_\gamma) = S_d \epsilon(E_\gamma) \int_0^V \int_0^{14} \frac{e^{-\Sigma L}}{4\pi L^2} \Phi(\vec{r}, t, E_n) n_i(t) \sigma_i(E_n) dE_n d\Omega, \quad (1)$$

in which $C_i(t,E_\gamma)$ is the detector count rate (1/s) of gamma rays at energy $E_\gamma$ from element i;
$\epsilon(E_\gamma)$ is relative detection efficiency of detector to gamma rays at energy $E_\gamma$;
$S_d$ is detector's effective area (cm$^2$);
$\Sigma$ is macroscopic absorption cross section (1/cm) of formation to gamma rays from element i when the neutron energy is in $E_n$;
L is the distance from the detector to a small volume $\Omega$ (cm);
$\vec{r}$ is the distance vector from the neutron source to a small volume $\Omega$ (cm);
$\Phi(\vec{r},t,E_n)$ is the neutron fluence rate at time t, at energy En, at position $\vec{r}$ per unit energy bin, per unit time (1/(cm$^2$·MeV·s));
ni(t) is atomic density of the target element i at time t, (1/cm$^3$), which changes with time as the logging tool passing through different depth intervals;
$\sigma_i(E_n)$ is cross section of fast neutron inelastic scattering or thermal neutron capture reaction with the target element i when the neutron energy is in En (cm$^2$); and
V is the total volume of near wellbore space (mainly wellbore and formation) where neutron-induced gamma rays can get to the detector.

Note that the detector count rate $C_i(t,E_\gamma)$ of gamma rays at each detector is known through measurement, as well as the neutron fluence rate $\Phi(\vec{r},t,E_n)$. Indeed, all parameters in Equation 1, including the atomic density of target element $n_i$, are either known or can be obtained/derived from measurements.

The total detector count rate $C(t,E_\gamma)$ at time t, energy $E\gamma$ of inelastic gamma rays from fast neutron inelastic scattering on all elements can be expressed as:

$$C(t,E_\gamma) = \Sigma_{i=1}^m C_i(t,E_\gamma) \quad (2),$$

where m is the total number of elements in the vicinity of the wellbore. Accordingly, the total detector count rate can either been measured or calculated based on the neutron fluence rate.

As shown in FIG. 10, the fast neutron fluence rate $\Phi(\vec{r},t,E_n)$ is used together with inelastic gamma ray count rate to calculate the formation density. The fast neutrons obtained at the near detector, the middle detector and the far detector are used to obtain fast neutron space, time and energy distribution. The inelastic gamma rays obtained at the near detector are mainly the initial inelastic gamma, while those arrived at the middle detector and the far detector are rays are mainly backscattered gamma rays. The measured fast neutron space, time and energy distribution, together with initial inelastic gamma rays at the near detector, backscattered inelastic scattering at the middle detector and the far detector, are then utilized to obtain the formation density. This method and system can be applied to both wireline and logging-while-drilling operations.

While in the foregoing specification this disclosure has been described in relation to certain preferred embodiments thereof, and many details have been set forth for purpose of illustration, it will be apparent to those skilled in the art that the disclosure is susceptible to alteration and that certain other details described herein can vary considerably without departing from the basic principles of the disclosure. In addition, it should be appreciated that structural features or methodologies shown or described in any one embodiment herein can be used in other embodiments as well.

The invention claimed is:

1. A method for evaluating a formation density of a subterranean formation, comprising:
   S1: deploying a nuclear logging tool into the subterranean formation, wherein the nuclear logging tool comprises one or more neutron generators and two or more dual-function detectors configured to simultaneously detect neutrons and gamma rays;
   S2: causing the one or more neutron generators to emit neutrons into the subterranean formation;
   S3: detecting neutrons and gamma rays from the subterranean formation at the two or more dual-function detectors to form electric signals, wherein the two or more dual-function detectors comprise a near detector and a far detector;
   S4: separating electric signals from neutrons and gamma rays for each of the two or more dual-function detectors;
   S5: obtaining detector count rates of total neutrons, fast neutrons and thermal neutrons; obtaining neutron fluence rates of fast neutrons and of thermal neutrons;
   S6: obtaining detector count rates of inelastic gamma rays and the energy spectrum of inelastic gamma rays; and
   S7: obtaining a first formation density value based on a ratio of the gamma ray count rate at the far detector and the gamma ray count rate at the near detector.

2. The method of claim 1, wherein the one or more neutron generators are utilized to generate neutrons in either pulse mode or continuous mode.

3. The method of claim 1, wherein, in S3, wherein the two or more dual-function detectors consist of a near detector, a middle detector, and a far detector.

4. The method of claim 3, wherein S7 further comprising obtaining a second formation density value based on a first ratio of the gamma ray count rate at the far detector and the gamma ray count rate at the near detector, a second ratio of the gamma ray count rate at the middle detector and the gamma ray count rate at the near detector, or a combination of the first ratio and the second ratio.

5. The method of claim 4, further comprising calculating a formation density as a weighted average of the first formation density value and the second formation density value.

6. The method of claim 4, wherein the gamma ray count rate at the near detector is attributed to initial inelastic gamma rays, and the gamma ray count rates at the middle detector and the far detector are attributed to backscattered inelastic gamma rays.

7. The method of claim 1, further comprising obtaining a space, time and energy dependent neutron fluence rate using neutrons detected at each dual-function detector.

8. The method of claim 7, wherein the neutron fluence rate is a fast neutron fluence rate.

9. The method of claim 1, wherein the nuclear logging tool has at least one neutron generator and at least two dual-function detectors at different locations configured to simultaneously detect both neutrons and gamma rays.

10. The method of claim 1, wherein the neutron source can be a D-T neutron generator or a D-D neutron generator.

11. The method of claim 1, wherein the detector count rates of inelastic gamma rays are adjusted based on the corresponding neutron fluence rates.

* * * * *